United States Patent [19]
Fehse

[11] Patent Number: 5,249,090
[45] Date of Patent: Sep. 28, 1993

[54] DISK STORE WITH DEVICE FOR FIXING THE DISK PACK ON ITS HUB SUCH THAT IT CAN BE REMOVED

[76] Inventor: Wolfgang Fehse, Ahornweg 8, 8951 Friensenried - Blocktack, Fed. Rep. of Germany

[21] Appl. No.: 806,972

[22] Filed: Dec. 12, 1991

[30] Foreign Application Priority Data

Mar. 14, 1991 [DE] Fed. Rep. of Germany ..... 41088331

[51] Int. Cl.⁵ .............................................. G11B 17/08
[52] U.S. Cl. ................................ 360/98.08; 360/99.12
[58] Field of Search ........................... 360/99.12, 98.08

[56] References Cited

U.S. PATENT DOCUMENTS

| | | | |
|---|---|---|---|
| 4,864,443 | 9/1989 | Peterson | 360/99.12 |
| 4,918,545 | 4/1990 | Scheffel | 360/98.08 |
| 5,101,306 | 3/1992 | Johnson | 360/99.12 |

OTHER PUBLICATIONS

M. H. Bosier and F. E. Castle, *Magnetic Disk Assembly,* I.B.M. Technical Disclosure Bulletin, vol. 22 No. 12 p. 5461, May 1980.
*Disk Pack Assembly Design,* I.B.M. Technical Disclosure Bulletin, vol. 32, No. 6A p. 129, Nov. 1989.

*Primary Examiner*—A. J. Heinz
*Attorney, Agent, or Firm*—Barry N. Young; Ronald C. Hudgens

[57] ABSTRACT

A device for fixing a disk pack to the drivable shaft of a disk store such that it can be removed comprises a spring lock washer which is mounted in a slot at the upper end of the shaft. A cup spring pre-tensioned against the disk pack is supported with its inner, inclined supporting surface against the spring lock washer, which is itself supported by the upper inclined side wall of the slot.

8 Claims, 2 Drawing Sheets

DISK STORE WITH DEVICE FOR FIXING THE DISK PACK ON ITS HUB SUCH THAT IT CAN BE REMOVED

Background of the Invention

The invention relates to a disk store with a driveable hub / shaft arrangement, a disk pack arranged on the hub / shaft arrangement designed to rotate with the hub / shaft arrangement about a common axis, and a device for fixing the disk pack to the hub / shaft arrangement such that it can be removed. This device comprises a ring-like spring arrangement which is arranged coaxially with the hub / shaft arrangement and fixed to it such that it can be removed. Its outer edge area is under initial tension lying against the upper disk of the disk pack which presses the disk pack against a limit stop on the hub side. Furthermore, the invention relates to a process for fixing a disk pack to the hub / shaft arrangement in a disk store by means of the aforementioned device for fixing the disk pack such that it can be removed.

In magnetic disk stores, the disks must be clamped to the hub / shaft arrangement with sufficient force to reliably prevent radial movement of the disk pack, which could result from unbalanced torsional forces, thermal expansion or sudden load changes during transportation. For this reason, the disk pack must be fixed to the hub / shaft arrangement with a defined clamping force.

In this respect, the fixing of a ring-like spring arrangement, in the form of a spring washer or cup spring or bell-shaped spring, to the hub by means of a screw centrally arranged in relation to the hub axis is known. In the case of disk packs which are held together in this manner by a central screw acting upon a cup spring, the entire clamping force between hub axis and hub outer edge must be supported. Since the hub base stressed in this way has only a limited load bearing capacity, in such an arrangement, the maximum attainable clamping force is limited to comparatively small values, such that this known arrangement can only be used for small disk diameters.

A further known solution consists of fixing one of the spring washers clamping the disk pack to the hub by means of a number of screws arranged along the circumference of the spring washer. Although this solution is suitable for all disk diameters, it is, however, more expensive in comparison to the first mentioned solution. Since only a limited number of screws can be used, there is also the risk that the clamping force is not evenly distributed over the circumference, which can warp the disks given the differing clamping forces, which can then lead to malfunctions during operation. Furthermore, with such an arrangement there is a risk of contamination from rubbed-off parts of the screws.

A further solution consists of fixing the cup spring to the hub by means of a nut centrally arranged in relation to the hub axis, which acts on the hub in conjunction with a corresponding threaded bolt. This solution is also more expensive in relation to the first mentioned solution and is, given the size of the thread / nut, only suitable for small disk diameters. Here, as well, there is the risk of contamination from rubbed-off parts of the thread. Finally, the size of the thread / nut arrangement is limited in practice; the larger the thread, the more expensive it is to manufacture, in order to maintain the required parallelism of nut and disk pack, for example. Furthermore, attaching the relatively flat nut becomes increasingly difficult, with the consequence that automation can only be achieved with difficulty.

A further solution to the problem of fixing the disk pack to the hub consists of shrink-fitting a ring, made from aluminum, for example, which holds the spring washer in position, onto the hub once the ring has been pre-tensioned to the desired initial tension. This process is suitable for all disk diameters, however it is perceived as disadvantageous in that it is relatively expensive, since very precise fitting between the hub and the ring to be shrink-fitted onto it is required.

Consequently, the invention is based on the problem of developing the fixing device for the disk pack such that the advantages of the arrangements corresponding to prior art are essentially achieved, without having to accept their disadvantages. In particular, the invention is based on the problem of creating a device for fixing the disk pack to the hub / shaft arrangement of a disk store such that it can be removed, which is equally suitable for all disk diameters, is economical to manufacture, can be easily fitted and for which the risk of contamination is minimal.

SUMMARY OF THE INVENTION

According to the invention this problem is essentially solved in that a surrounding slot is formed at one end of the hub / shaft arrangement, in that a spring lock washer is arranged in the slot, the external diameter of which when released is larger than the internal diameter of the spring arrangement, and in that the internal diameter of the spring arrangement is smaller than the external diameter of the aforementioned one end of the hub / shaft arrangement in the area adjacent to the slot extending to the aforementioned end plus twice the cross-sectional diameter of the spring lock washer. When a disk pack is fixed to the hub / shaft arrangement, the pre-tensioned spring arrangement is supported by the spring lock washer and the spring lock washer is supported by the side faces of the slot adjacent to the aforementioned end of the hub / shaft arrangement.

The process according to the invention essentially consists of placing the spring lock washer in the slot at the hub / shaft arrangement, of compressing the spring lock washer to an external diameter smaller than the internal diameter of the spring arrangement, of pushing the spring arrangement onto the hub / shaft arrangement, of pre-tensioning the spring arrangement to a desired initial tension by applying pressure in the direction of the disk pack until the inner edge of the spring arrangement has moved at least in part past the spring lock washer, and, finally, of releasing the spring lock washer, whereby it is supported on the one hand by the upper side wall of the slot and on the other hand by the inner edge of the spring lock washer and thus holds the spring lock washer in the defined position. The spring washer can preferentially be compressed by means of a slip-on sleeve on the hub / shaft arrangement between hub / shaft arrangement and spring arrangement, which, at the same time, holds the spring lock washer in the compressed position for the required duration.

The fixing device according to the invention simply comprises, in addition to the spring arrangement in the form of a spring washer or similar which is also required in prior art, a slot and a simple spring lock washer and is thus extremely economical to manufacture. The risk of contamination from rubbed-off parts which occurs in prior art in connection with screw threads practically does not exist in the case of the invention under consideration. Using the fixing device according to the invention, the disk pack can be very easily, quickly and reliably fixed or removed and automation is possible without further adaptation. The fixing device according to the invention is suitable for all disk diameters. The clamping ring is very light such that only very small imbalance forces occur. The arrangement is self-centering, i.e. the clamping ring-like spring arrangement is automatically centered with a high degree of accuracy by means of the spring lock washer, thus avoiding imbalance of the arrangement. The clamping force of the spring arrangement acts evenly over its entire circumference, thus avoiding warping of the disks in the disk pack, as sometimes occurs in prior art.

In a more advantageous development of the invention it is envisaged that the spring arrangement will have a radial internal supporting surface, which forms an acute angle with the axis of the hub / shaft arrangement. Furthermore, it is preferred if the side face of the slot adjacent to the aforementioned one end, therefore, as a rule, the upper end of the hub, which supports the spring lock washer, forms an acute angle with the axis of the hub / shaft arrangement. Preferentially, the acute angle between the aforementioned side face of the slot and the axis of the hub / shaft arrangement should be larger than the acute angle between the aforementioned internal supporting surface of the spring arrangement and the axis of the hub / shaft arrangement.

On the basis of the aforementioned arrangement, precise centering of the spring arrangement in relation to the axis of the hub / shaft arrangement is possible, particularly given the radial force which occurs with the design according to the invention, which is produced by the conical form of the surface of the spring arrangement in contact with the spring lock washer which holds it in place. In contrast, exact radial centering is not achieved with the type of fixing corresponding to prior art, namely a central screw, nut or shrink-fitted fixing ring, since the screw, nut or fixing ring only produce axial forces. The rough centering in the prior art achieved by placing the spring arrangement on the outer surfaces of the hub or by orienting the cup spring on the screw thread is not comparable to the exact centering achieved according to the invention under consideration.

Further advantageous features of the invention result from the other sub-claims.

BRIEF DESCRIPTION OF THE DRAWINGS

Several preferred embodiments of the invention are explained in greater detail below using the drawing. Diagrammatic representations of the following are shown in the drawing.

DETAILED DESCRIPTION OF THE PREFERRED EMBODIMENT

Figure 1:
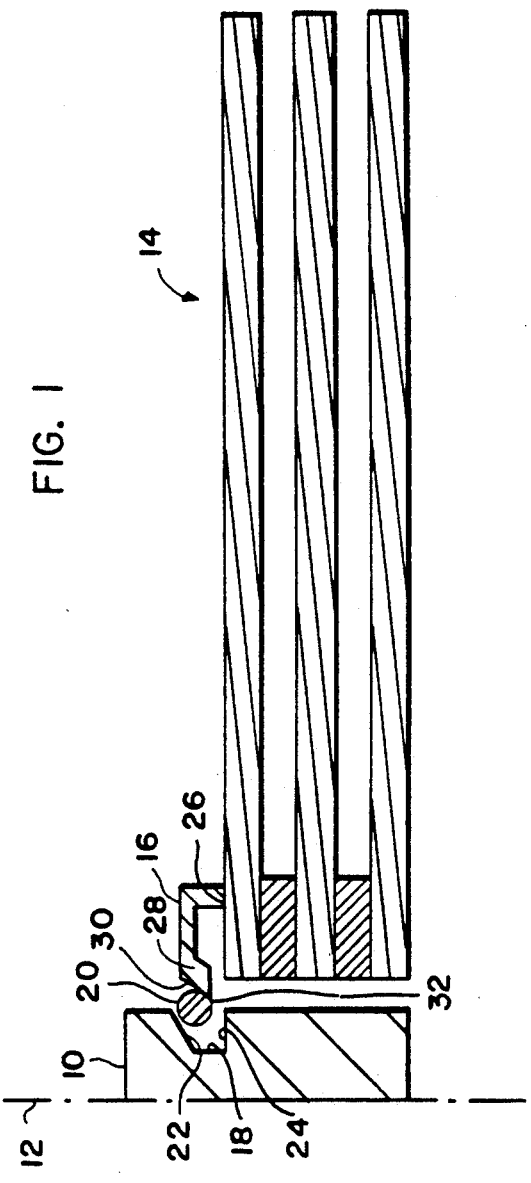
FIG. 1 a vertical axial section through a disk pack which is fixed to the driveable shaft of a disk store by means of the fixing device according to the invention, FIG. 2a–2d various stages of an initial embodiment of the process for fixing the disk pack to the shaft in order to achieve the arrangement shown in FIG. 1, and FIG. 3a–3d various stages of a second embodiment of the process for fixing the disk pack to the shaft in order to achieve the arrangement shown in FIG. 1.

Reference is first made to FIG. 1. A disk store, which is not represented in greater detail below, comprises a drive shaft 10 which is driven in a rotational manner about an axis 12. A hub, which is not represented in greater detail, is fixed to the shaft 10 coaxially with the axis 12, which has a lower, radial flange, on which lies a disk pack designated by the reference number 14. A spring arrangement 16, which is a ring-like member, grips the opposite side of the disk pack, which in the representation shown in FIG. 1 is shown at the top, and presses the disk pack 14 downwards against the surface of the limit stop on the hub side. In so far as the arrangement has been described previously, this corresponds to known prior art and is familiar to the specialist skilled in the art.

At the area at the upper end of the shaft 10 there is a peripheral slot 18, in which a spring lock washer 20 is arranged. The slot 18 comprises an upper side face 22 adjacent to the upper end of the shaft 10, which is conical in shape and forms an acute angle with the axis 12; in the embodiment represented, this is an angle of approximately 60°. The lower side wall 24 of the slot 18 is designed radially in relation to the axis 12, thus standing at right angles to the shaft 10. The depth of the slot 18 is at least equal to the diameter of the spring lock washer 20.

The spring arrangement 16 in the form of a cup spring has an external flange 26 directed downwards towards the disk pack 14, and, under initial tension, the lower end of this flange presses the cup spring 16 against the disk pack 14. At the internal edge area, the cup spring 16 has a peripheral flange section 28, which is directed downwards and inwards, the internal supporting surface 30 of which, adjacent to the shaft 10, is conical in shape and forms an acute angle with the axis 12. The angle between the supporting surface 30 and the axis 12 is smaller than the angle between the side face 22 of the slot and the axis 12. In the embodiment under consideration, the angle between the supporting surface 30 and the axis 12 is approximately 30°.

The internal edge 32 of the cup spring 16 is arranged at such a distance from the shaft 10 that an assembly sleeve 34 (see FIG. 2) can be pushed between the cup spring 16 and shaft 10, as explained in greater detail below. The distance between the internal edge 32 and the shaft 10 (or its enveloping surface) must clearly be smaller than the thickness of the spring lock washer 20, as is clearly shown from the figures. In practice, the spacing should be selected such that, when the spring lock washer is subjected to the desired initial tension, the spring lock washer 20 can be guaranteed to lie on the one hand against the supporting surface 30, and on the other hand against the inclined side face 22 of the slot 18.

The spring lock washer 20, which is made from spring steel, should on one hand be compressed to least such an extent that when compressed its outer circumference does not protrude out of the slot 18, which is trapezoidal in cross-section. When released, the external diameter of the spring lock washer 20 must be at least large enough that the spring lock washer 20 can be supported by the supporting surface 30. In the embodiment described, the diameter of the spring lock washer 20 when released is large enough to be caught by the assembly sleeve 34, described in greater detail below, and pressed inwards.

Below, reference is made to FIGS. 2a to 2d, which outline the process for assembling the disk pack on the hub / shaft arrangement of the disk store.

Firstly, the spring lock washer 20, in the form of a split ring, is pushed from above over the end of the shaft 10 and inserted into the slot 18. An assembly tool in the form of an assembly sleeve 34 with a lower edge 35, the top of which is bevelled inwards, is pushed from above over the shaft 10 and a cup spring 16 is pushed from above over the assembly sleeve 34 and roughly centered by the assembly sleeve 34 (see FIG. 2a).

Figure 2A:
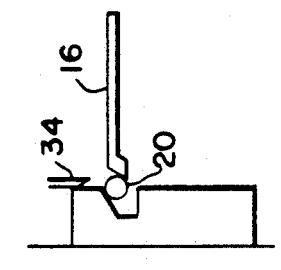
Figure 2B:
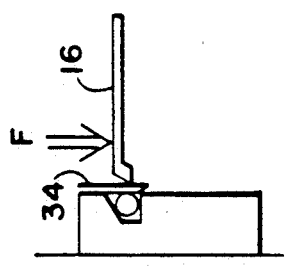
Figure 2C:
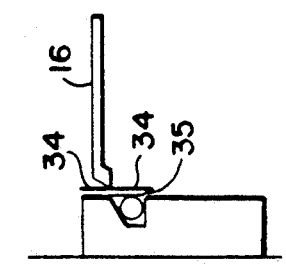
Figure 2D:
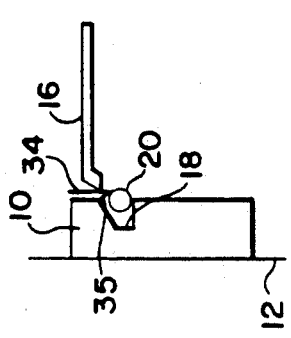

Then, the assembly sleeve 34 is pushed downwards, whereby the spring lock washer is compressed and pushed into the slot 18 (see FIG. 2b). Then, using a suitable tool, which is not represented in greater detail, the cup spring 16 is compressed by the application of a force F, i.e. pressed downwards at its inner area, until it reaches the desired initial tension (see FIG. 2c). Finally—whilst maintaining the selected initial tension—the assembly sleeve is pulled upwards again, permitting the spring lock washer to expand again and to move into the position represented in FIG. 2d, in which it is supported by the side face 22 on the one hand and by the supporting surface 30 on the other hand, and thus holds the cup spring 16 in the set position.

The cup spring is no longer held in position by the spring lock washer and presses against the disk pack 14 with a very precisely pre-determined initial tension, whereby the arrangement is practically insensitive to tolerances relating to the height of the disk pack, the dimensions of the cup spring and the thickness of the spring lock washer. In order to remove the disk pack from the shaft 10 it is simply necessary to press the cup spring downwards and then to remove the spring lock washer 20 by radial expansion out of the slot and upwards. The spring lock washer 20 and the cup spring 16 can then be pulled upwards and the disk pack 14 can be removed from the shaft 10.

Below, reference is made to the embodiment shown in FIGS. 3a to 3d. This embodiment differs from the embodiment shown in FIGS. 2a to 2d in so far as, firstly, the diameter of the spring lock washer 20 when released is such here that its internal diameter is equal to or slightly larger than the diameter of the shaft 10, i.e. particularly the upper area of the shaft 10 adjacent to the slot 18, so that when untensioned the spring lock washer 20 springs completely out of the slot and can be stripped upwards from the shaft without the use of a tool. In this embodiment, in order to remove the disk pack from the shaft 10, it is, therefore, only necessary to press the cup spring downwards until the spring lock washer 20 springs out of the slot by radial expansion due to its initial tension; the spring lock washer 20 and the cup spring 16 can then be pulled upwards and the disk pack 14 can be removed from the shaft 10.

In this embodiment, the simple form of the assembly sleeve (as shown in FIGS. 2a to 2d) can no longer be used unless the spring lock washer 20 in pre-compressed, since the assembly sleeve 34 can no longer grip and press the released spring lock washer 20 inwards. A slightly more complex assembly tool is therefore required, as outlined in FIGS. 3a to 3d under reference number 36.

The multiple-armed assembly tool 36 comprises several assembly arms 38 arranged coaxially with the axis 12, which is also the axis of the multiple-armed multiple-armed assembly tool 36, which together roughly form a bell-shaped split sleeve. Each assembly arm 38 comprises an upper initial section 40, which essentially extends parallel to the axis 12 in the assembly tool's initial operating state represented in FIG. 3a. A second section 42 is connected below the first section 40 at an obtuse angle and directed outwards in relation to the axis 12, and a retainer section 44 is connected below this second section 42, the outer surface of which (in relation to the axis 12) is bent back in the direction of the axis 12 and which has a recess 46 to hold the spring lock washer 20 on its side adjacent to the axis 12.

Figure 3D:
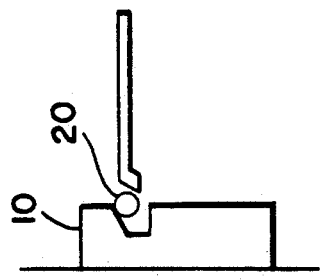
Figure 3C:
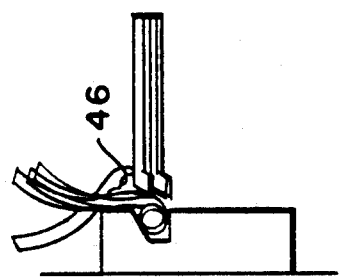
Figure 3B:
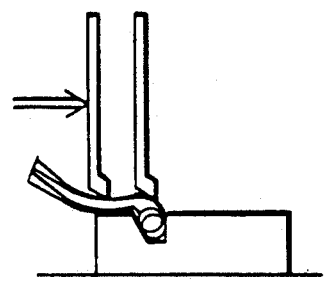
Figure 3A:
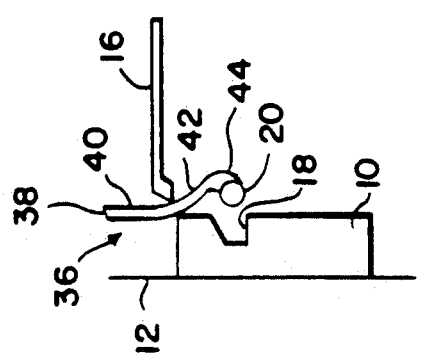

For assembly, the spring lock washer 20 is placed in the recesses 46 of the assembly arms 38 and the assembly tool, which is sleeve-shaped overall, is placed on the shaft 10 in the axial direction, as represented in FIG. 3a. The cup spring 16 is then pushed from above in the axial direction onto the sleeve-shaped multiple-armed assembly tool 36 and pressed downwards. This causes the cup spring 16 to press then second sections 42 of the assembly arms 38 radially inwards into position against the shaft 10, as outlined in FIG. 3b. At the same time, the retainer sections 44 together with the spring lock washer 20, which are initially at the height of the slot 18, are moved downwards into the slot 18 under compression from the spring lock washer 20. After compressing the cup spring 16 further, the multiple-armed assembly tool 36 can be moved upwards by releasing the spring lock washer 20, whereby the retainer sections 44 of the assembly arms 38 between the supporting surface 30 of the cup spring 16 and the side face 22 slide upwards and out of the slot 18, and after the load on the cup spring 16 has been relieved slightly, the spring lock washer 20 moves into the extended final position represented in FIG. 3d, but can no longer escape.

I claim:

1. A disk clamping apparatus comprising:

a shaft for holding a disk pack thereon, the shaft having a circular peripheral slot formed at one end, the slot comprising a conical upper side face adjacent to the one end of the shaft and forming an acute angle with the axis of the shaft, the one end of the shaft having an external diameter;

a ring-like member for securing a disk pack around the shaft, the member comprising a conical internal supporting surface forming an acute angle with the axis of the shaft, the acute angle between the conical internal supporting surface of the member and the axis of the shaft being smaller than the acute angle between the side face of the slot and the axis of the shaft, the member having an internal diameter at the smallest end of the conical internal supporting surface and having an outer edge area for contact with top of the disk pack;

a circular split spring lock washer for arrangment in the slot, the spring lock washer having an internal diameter, an external diameter, and a cross-sectional diameter, the external diameter being larger than the internal diameter of the member when the spring lock washer is released, the spring lock washer being dimensioned such that twice the cross-sectional diameter plus the external diameter of the one end of the shaft is larger than the internal diameter of the member, the spring lock washer being arranged between the conical upper side face of the slot and the conical internal supporting surface of the member when the disk pack is in place on the shaft, such that the spring lock washer exerts an outward radial and downward axial force against the conical internal supporting surface of the member, and exerts an inward radial and upward axial force against the upper side face of the slot, such that the disk pack is supported by the member, the member is supported by the spring lock washer, and the spring lock washer is supported by the upper side face of the slot adjacent to the one end of the shaft.

2. The disk clamping apparatus of claim 1, wherein the slot further comprises a lower side wall opposite the one end of the shaft and is arranged perpendicular to the axis of the shaft, such that the cross-section of the slot is trapezoidal.

3. The disk clamping apparatus of claim 1, wherein the spring lock washer can be compressed such that its external diameter is smaller than or equal to the internal diameter of the member.

4. The disk clamping apparatus of claim 1, wherein the spring lock washer can be compressed in such a manner that it does not protrude from the cross-section of the slot.

5. A method of securing a disk pack to a shaft of a disk store comprising the following steps:

providing a shaft having a circular peripheral slot formed at one end, the slot comprising a conical upper side face adjacent to the one end of the shaft and forming an acute angle with the axis of the shaft, the one end of the shaft having an external diameter;

providing a ring-like member for securing a disk pack around the shaft, the member comprising a conical internal supporting surface forming an acute angle with the axis of the shaft, the acute angle between the conical internal supporting surface of the member and the axis of the shaft being smaller than the acute angle between the side face of the slot and the axis of the shaft, the member having an internal diameter at the smallest end of the conical internal supporting surface and having an outer edge area for contact with top of the disk pack;

providing a circular split spring lock washer having an internal diameter, an external diameter, and a cross-sectional diameter, the external diameter being larger than the internal diameter of the member when the spring lock washer is released, the spring lock washer being dimensioned such that twice the cross-sectional diameter plus the external diameter of the one end of the shaft is larger than the internal diameter of the member;

inserting the spring lock washer into the slot;

compressing the spring lock washer such that the external diameter of the spring lock washer is smaller than the internal diameter of the member;

placing the member onto the shaft;

urging the member by the application of pressure in the direction of the disk pack, until the internal edge of the member has moved at least in part past the spring lock washer, and releasing of the spring lock washer.

6. The method of claim 5, wherein the step of compressing the spring lock washer comprises using an assembly sleeve on the shaft between the shaft and the member.

7. The method of claim 5, wherein the step of compressing the spring lock washer comprises using a multiple-armed assembly tool, the arms of which hold the spring lock washer and can be moved radially, the arms gripping between the shaft and the member.

8. The method of claim 7, wherein the radial movement of the arms is controlled by pushing the member onto the shaft.

* * * * *